(12) United States Patent  (10) Patent No.: US 9,336,473 B2
Nowak  (45) Date of Patent: May 10, 2016

(54) VIRTUAL INK CHANNELS

(71) Applicant: ELECTRONICS FOR IMAGING, INC., Fremont, CA (US)

(72) Inventor: Friedrich Nowak, Dortmund (DE)

(73) Assignee: Electronics for Imaging, Inc., Fremont, CA (US)

( * ) Notice: Subject to any disclaimer, the term of this patent is extended or adjusted under 35 U.S.C. 154(b) by 0 days.

(21) Appl. No.: 14/483,657

(22) Filed: Sep. 11, 2014

(65) Prior Publication Data

US 2016/0078329 A1  Mar. 17, 2016

(51) Int. Cl.
*H04N 1/405* (2006.01)
*G06K 15/00* (2006.01)
*G06K 15/02* (2006.01)
*G06F 3/12* (2006.01)

(52) U.S. Cl.
CPC .............. *G06K 15/407* (2013.01); *G06F 3/123* (2013.01); *G06F 3/1257* (2013.01); *G06K 15/1878* (2013.01); *G06K 15/1882* (2013.01)

(58) Field of Classification Search
CPC ... H04N 1/6058; H04N 1/603; H04N 1/6052; H04N 9/3182; H04N 1/60; H04N 1/6022; H04N 9/73; G09G 2340/06; G09G 2320/0276; G09G 2320/0666; G09G 5/06; G06K 15/1878

USPC ........... 358/1.9, 2.1, 504, 515–518, 527, 468, 358/1.13; 382/162–167

See application file for complete search history.

(56) References Cited

U.S. PATENT DOCUMENTS

| 5,978,011 A | 11/1999 | Jacob et al. | |
|---|---|---|---|
| 6,373,595 B1 * | 4/2002 | Semba et al. | 358/1.9 |
| 6,851,783 B1 * | 2/2005 | Gupta et al. | 347/15 |
| 2003/0123072 A1 | 7/2003 | Spronk | |
| 2004/0263881 A1 * | 12/2004 | Ito et al. | 358/1.9 |
| 2005/0206926 A1 * | 9/2005 | Tsuji | 358/1.9 |
| 2006/0158481 A1 | 7/2006 | Spevak et al. | |
| 2007/0188535 A1 | 8/2007 | Elwakil et al. | |
| 2010/0039463 A1 | 2/2010 | Vam Thillo et al. | |
| 2013/0215440 A1 | 8/2013 | Chandermohan et al. | |
| 2014/0125718 A1 | 5/2014 | Morrision et al. | |
| 2014/0126001 A1 | 5/2014 | Nudurumati et al. | |
| 2014/0126004 A1 * | 5/2014 | Miyahara | 358/1.9 |

* cited by examiner

*Primary Examiner* — Thomas D Lee
*Assistant Examiner* — Stephen M Brinich
(74) *Attorney, Agent, or Firm* — Perkins Coie LLP

(57) ABSTRACT

Virtual ink channels are created with colored media and white ink to afford multi-channel ICC profile creation by using ICC profiling software. The available color gamut is enhanced for an device that defines a color space with a color profiler, e.g. an ICC profiler. Thus, an available color gamut for an input or output device is enhanced or extended by creating virtual ink channels for use with profiling software. This allows the use of media types and/or inks that are otherwise not supported by the profiling software.

13 Claims, 6 Drawing Sheets

VIRTUAL INK CHANNELS

FIELD

The invention relates to color management. More particularly, the invention relates to using virtual ink channels to extend the capabilities of a commercial ICC profiler.

BACKGROUND

In the field of color management, a color profile comprises a set of data that characterizes a color space, such as for a color output device, wherein the color profile is often based on standards set by the International Color Consortium (ICC).

FIG. 1 illustrates a visible colorspace, i.e. spectrum, including colors represented within the visible colorspace, e.g. red, orange, yellow, green, blue, indigo, and violet. Also shown in FIG. 1 is an RGB color gamut, and a CMYK color gamut. For example, devices, images and designs can be defined by an RGB color gamut, based on red (R), green (G), and blue (B). As well, some devices, images and designs can be defined by a CMYK color gamut, based on varying amounts of cyan (C), magenta (M), yellow (Y), and black (K).

As FIG. 1 shows, the RGB color gamut can approximate some but not all colors within the visible spectrum. Display devices, such as computer monitors and television screens, can operate within an RGB color spectrum, such as with red, green and blue elements that can be powered at different intensities.

As also shown in FIG. 1, not all colors in an RGB color gamut can be represented in a CMYK color gamut, which is commonly used for output devices, e.g. printers. In addition to the use of cyan, magenta, yellow, and black toners or inks, some printing systems allow the use of white or other spot colors.

Color profiles for output devices allow color management systems to convert color data between color spaces, such as between a device independent color space and a native device color space, or between device color spaces. The ICC specifies color profiles for input devices, display devices, and output devices.

White spot color, which can be used as a special spot color channel within some printing systems, is not included in the creation of an ICC profile when using commercial ICC profiler software. Thus, neither a media color nor the white ink channel are used to match possible colors correctly. Thus, the media color may be such that it is not possible to print a desired color on such media because it would be necessary to print colors that are not within the print device gamut if the printed image is to compensate for the effect on the image created by the media color.

Commercial ICC profiler software expects brighter media color than inks, and inks must have chromaticity and transparency. This is not provided with a printing system that offers white ink. White ink has neither chromaticity nor transparency, and colored media is darker than the white ink. As such, white ink cannot be processed inside commercial and common ICC profiler software. In practice white ink is only used to cover colored media, and then 4-channel CMYK ink is printed on top of that white ink layer.

SUMMARY

Embodiments of the invention enhance or extend an available color gamut for an input or output device by creating virtual ink channels for use with profiling software. This allows the use of media types and/or inks that are otherwise not supported by the profiling software.

DETAILED DESCRIPTION

Embodiments of the invention enhance the available color gamut for a device that defines a color space with a color profiler, e.g. an ICC profiler. A color profiler uses a software algorithm to adjust the numerical values that are sent to, or received from, different devices so that the perceived color they produce remains consistent. A key issue with such profiler is how to deal with a color that cannot be reproduced on a certain device to show it through a different device as if it were visually the same color, just as when the reproducible color range between color transparencies and printed matters are different. Some well known color profilers are ColorSync, Adobe CMM, LittleCMS, and ArgyllCMS.

In embodiments of the invention, colored media types can be postulated as a virtual ink channel on a print system that also offers white ink. Embodiments of the invention enhance or extend an available color gamut for an input or output device by creating virtual ink channels for use with profiling software. This allows the use of media types and/or inks that are otherwise not supported by the profiling software and solves the problem of characterizing the gamut when using a commercial ICC profiler without special white ink support or features and exploiting the media color to the gamut volume for an ICC profile.

In embodiments of the invention, colored media is used in printing systems, along with white ink, to extend the gamut volume for print jobs. Multi-channel ICC profile creation is performed using commercial ICC profiler software. The media color and white ink are then used with the color management system to print desired colors correctly.

Figure 1:
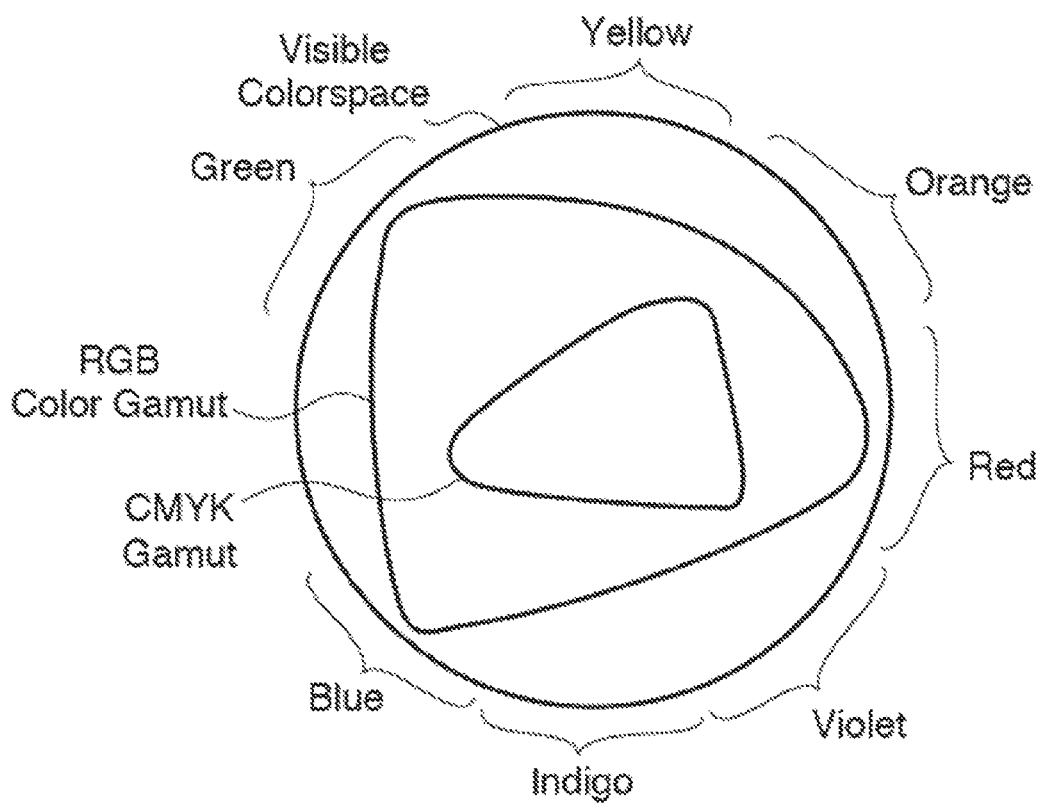
FIG. 1 illustrates a visible colorspace, i.e. spectrum, an RGB color gamut, and a CMYK color gamut.
Figure 2:
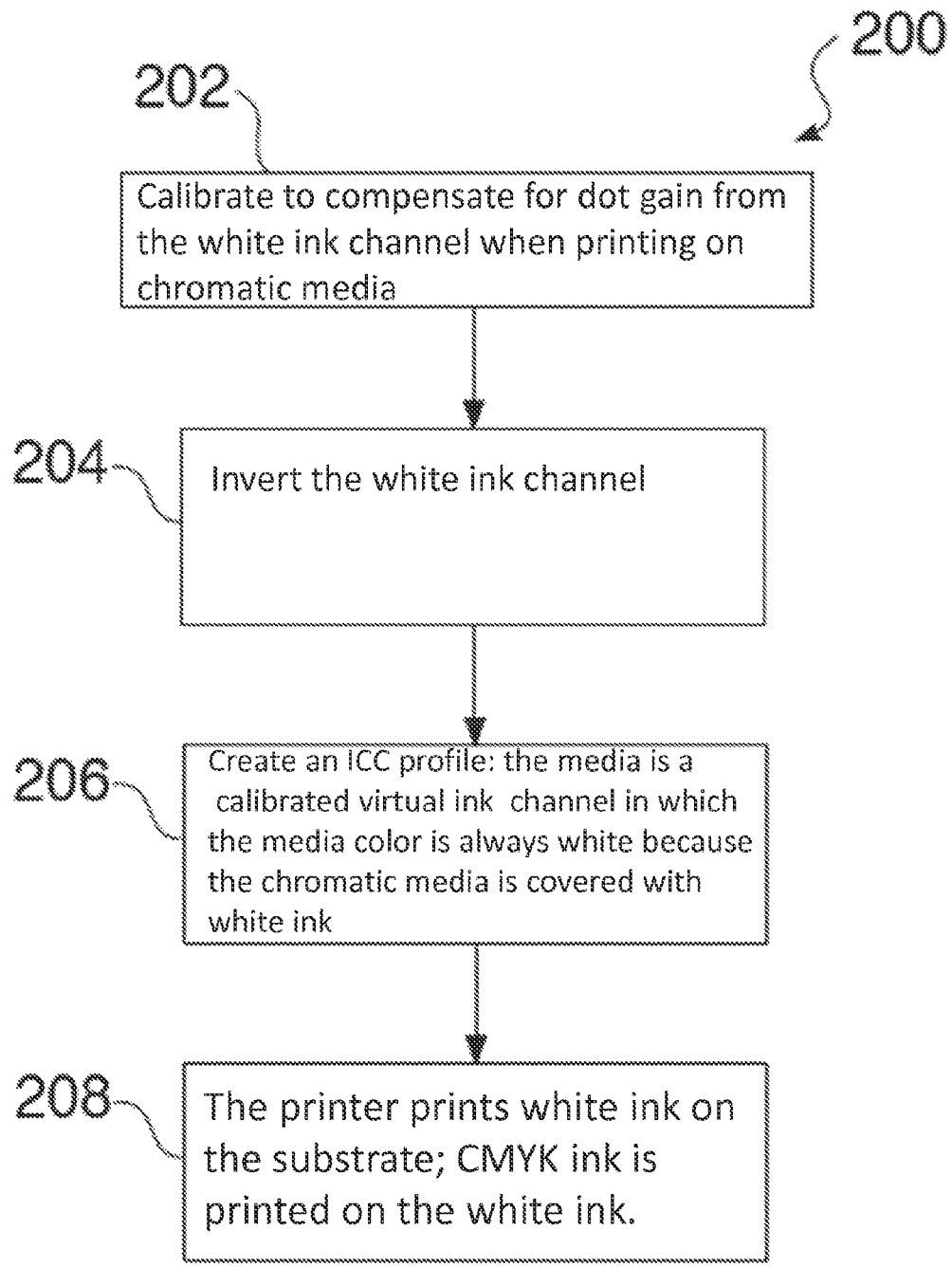
FIG. 2 is a flow diagram showing the creation of a chromatic virtual ink channel and virtual media white in a print system according to the invention.

FIG. 2 is a flow diagram showing the creation of a chromatic virtual ink channel and virtual media white in a print system (200) according to the invention. The first step is to perform a calibration. The printing system, i.e. the printer and software, compensates for the dot gain from the white ink channel when printing on chromatic media (202). This calibration process removes dot gain and gamut compression and thus makes the gamut more predictable to an ICC profiling process.

After this calibration process is done, the print system inverts the white ink channel internally (204), e.g. the white channel is set to 100%. Inverting the white ink channel can be done from the print job creator or with functions from the print software itself. From the perspective of the ICC profiler and color management, the media becomes a calibrated virtual ink channel. From the perspective of the ICC profile creation and color management, the media color is always white because the chromatic media is covered with white ink. This can be used to create an ICC profile with commercial and common ICC profiler software (206).

Embodiments of the invention are also applicable to transparent and un-colored media types. When printing on colored media types, the white ink layer is deposited on the bottom directly on the media (208) (see FIG. 4, discussed below). With a transparent media type, the white ink layer is on the top of the colored ink layers, but needs a colored background, e.g. a tint that is the inverse of the color of the transparent media.

Figure 3:
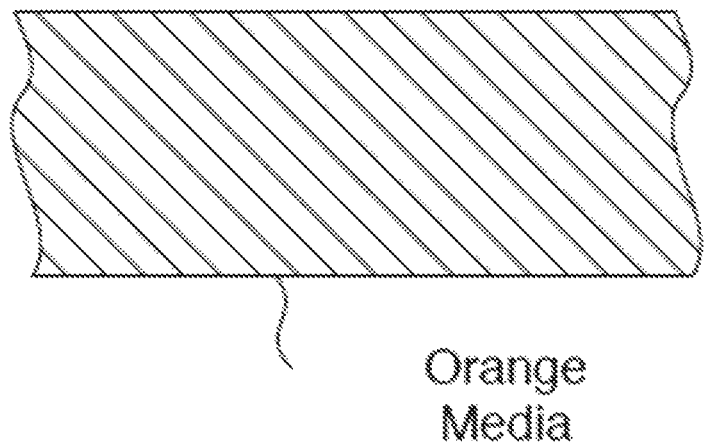
FIG. 3 is a schematic illustration of a colored substrate and its relation to a CMYKW color profile according to the invention.

FIG. 3 is a schematic illustration of a colored substrate and its relation to a CMYKW color profile according to the invention. FIG. 3 provides an example with white ink, an orange vinyl media, and a 5-Channel ICC. In this example, the printer ink channels are Cyan, Magenta, Yellow, Black, and White Ink (CMYKW). The user selects a profile for an orange vinyl media type. In this example, the orange is outside the gamut volume of what can be achieved with the regular 4-Channel CMYK when printing on regular white vinyl. When inverting, the white ink channel (CMYKW) becomes a virtual color mode CMYK and Orange from the ICC and color management point of view. Orange from the media is now the inverted white ink channel, i.e. the virtual orange ink channel.

The ICC profiler and color management expects the brightest color without chromaticity when printing C0 M0 Y0 K0 O0. The real color mode inverts the orange channel to the white ink channel C0 M0 Y0 K0 W100. Thus, the profiler processes for CMKYO, where O is a virtual Orange channel, while the printer prints CMKKW, where W is a layer of white ink printed on the media.

Figure 4:
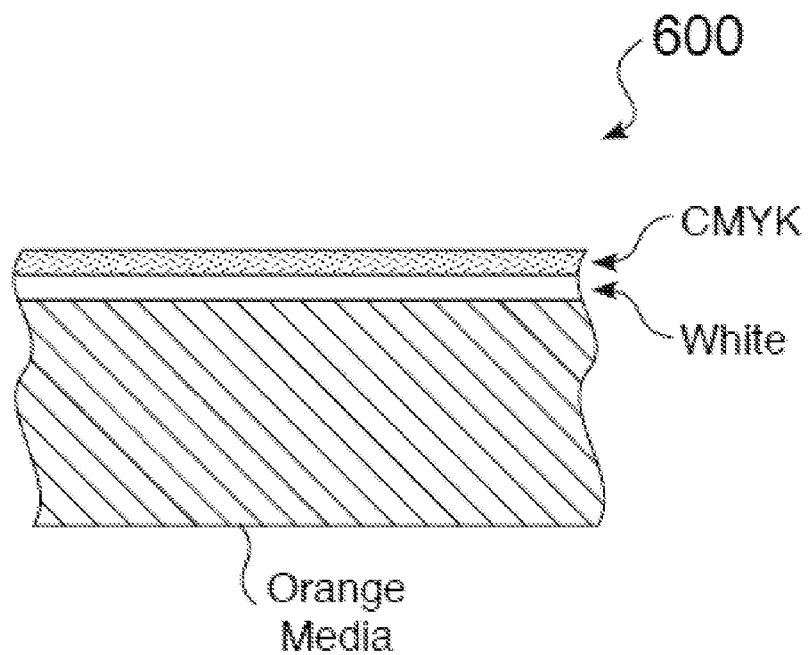
FIG. 4 is a schematic illustration of a colored substrate upon which white ink and CMYK ink have been deposited according to the invention.

FIG. 4 is a schematic illustration of a colored substrate upon which white ink and CMYK ink have been deposited according to the invention. The white ink covers the orange media and the ICC profiler software sees the white ink channel as a typical white media type. Otherwise, when the ICC profile tries to characterize the virtual orange C0 M0 Y0 K0 O100, the print system is driving the white ink with C0 M0 Y0 K0 W0. No ink is printed and, from the ICC/color management perspective, the printer delivers 100% Orange; on the real physical print just the orange vinyl is going through the color management and ICC profile creation.

All mixed colors with CMYKW (CMYKO) should now be predictable for correct color matching when creating a 5-channel ICC using white ink and chromatic media types.

Figure 5:
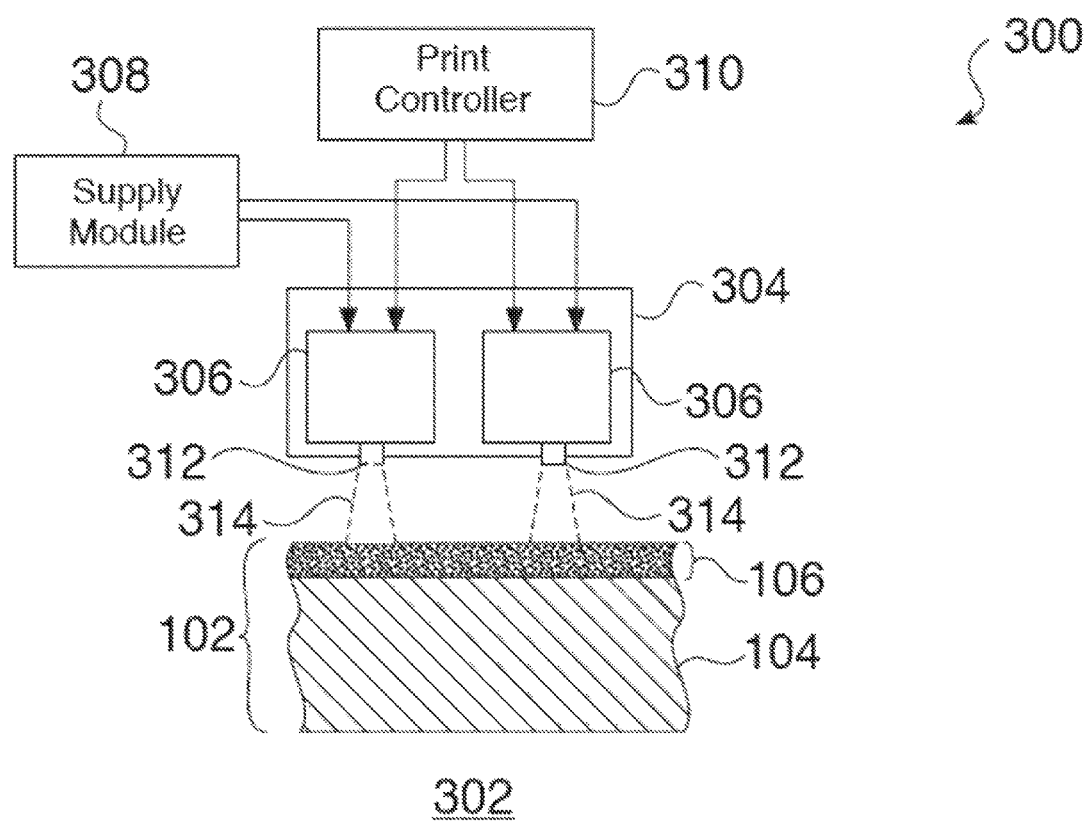
FIG. 5 is a schematic diagram of an exemplary printing environment for jetting ink onto a media according to the invention.

FIG. 5 is a schematic diagram 300 of an exemplary printing system 302 for jetting 314 ink 106 onto media 104. The printing system 302 seen in FIG. 4 includes a print head assembly 304, comprising one or more print heads 306 having corresponding jets 312. A supply module 308 is connected to the print heads 306, whereby the ink is transferred to the print heads 306, for jetting 314 onto media 104, as controlled by a print controller 310.

Figure 6:
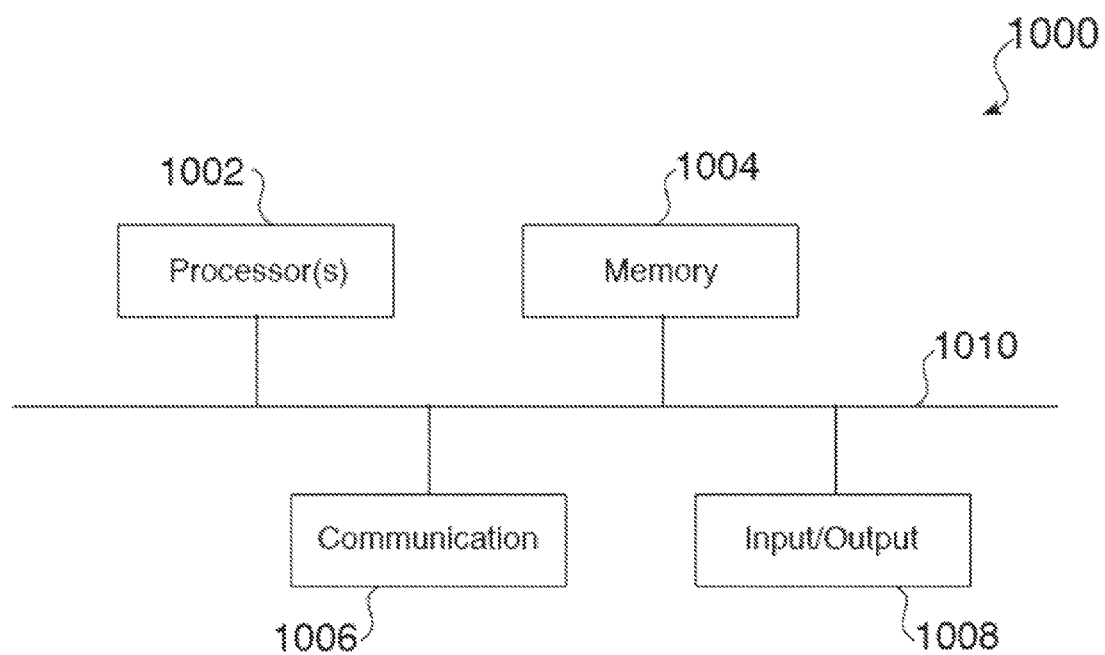
FIG. 6 is a high-level block diagram showing an example of a processing device that can represent any of the systems described herein.

FIG. 6 is a high-level block diagram showing an example of a processing device 1000 that can be a part of any of the systems described above, such the print controller 310, or for any other input or output device that defines a color space using a color profile. Any of these systems may be or include two or more processing devices, which may be coupled to each other via a network or multiple networks.

In the illustrated embodiment, the processing system 1000 includes one or more processors 1002, memory 1004, a communication device 1006, and one or more input/output (I/O) devices 1008, all coupled to each other through an interconnect 1010. The interconnect 1010 may be or include one or more conductive traces, buses, point-to-point connections, controllers, adapters and/or other conventional connection devices. The processor(s) 1002 may be or include, for example, one or more general-purpose programmable microprocessors, microcontrollers, application specific integrated circuits (ASICs), programmable gate arrays, or the like, or a combination of such devices. The processor(s) 1002 control the overall operation of the processing device 1000. Memory 1004 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1004 may store data and instructions that configure the processor(s) 1002 to execute operations in accordance with the techniques described above. The communication device 1006 may be or include, for example, an Ethernet adapter, cable modem, Wi-Fi adapter, cellular transceiver, Bluetooth transceiver, or the like, or a combination thereof.

Depending on the specific nature and purpose of the processing device 1000, the I/O devices 1008 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The color profile enhancement techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, or any device with one or more processors, etc.). For example, a machine-accessible medium includes recordable/non-recordable media, e.g. read-only memory (ROM); random access memory (RAM); magnetic disk storage media; optical storage media; flash memory devices; etc.

Although the invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for enhancing or extending an available color gamut in a print device, comprising:
   providing a processor executing instructions for creating a virtual ink channel;
   said processor using said virtual ink channel to generate a multi-channel profile for use in said print device;

said processor applying said virtual ink channel within a color management system to print desired colors correctly on a colored media; and said processor causing said print device to print on said colored media using said color management system;

wherein said virtual ink channel is created based upon the color of said colored media.

2. The method of claim 1, further comprising:
said processor generating said profile with an ICC profiler.

3. The method of claim 1, further comprising:
creating said virtual channel from a white ink channel.

4. The method of claim 1, further comprising:
calibrating said print device to compensate for dot gain from said virtual ink channel.

5. The method of claim 3, further comprising:
inverting said white ink channel.

6. The method of claim 1, further comprising:
covering said colored media with white ink.

7. The method of claim 1, further comprising:
said virtual channel depositing a white ink layer directly on the media when printing on colored media.

8. The method of claim 1, further comprising:
said virtual channel depositing a white ink on top of colored ink layers with a colored background when printing on transparent media.

9. The method of claim 1, wherein the print device ink channels comprise Cyan, Magenta, Yellow, Black, and White Ink (CMYKW);

further comprising a user selecting a profile for a media having a color (N); and inverting the white ink channel (W), wherein the media becomes the inverted white ink channel and said ink channels comprise Cyan, Magenta, Yellow, Black, and N Ink (CMYKN).

10. A method for enhancing or extending an available color gamut in a print device, comprising:

providing a processor executing instructions for creating a virtual ink channel for a selected media color from a white ink channel;

inverting said white ink channel;

said processor using said virtual ink channel to generate a multi-channel profile for use in said print device; and applying said virtual ink channel within a color management system to print desired colors correctly; and causing said print device to print on a media of said selected media color using said color management system.

11. The method of claim 10, further comprising:
calibrating said print device to compensate for dot gain from said virtual ink channel.

12. The method of claim 10, further comprising:
said virtual channel depositing a white ink layer directly on the media of said selected media color.

13. The method of claim 10, further comprising:
said virtual channel depositing a white ink on top of colored ink layers with a colored background when printing on transparent media.

\* \* \* \* \*